Jan. 18, 1927.
H. B. SANKEY
SPOKED WHEEL
Filed Sept. 9, 1925
1,614,901
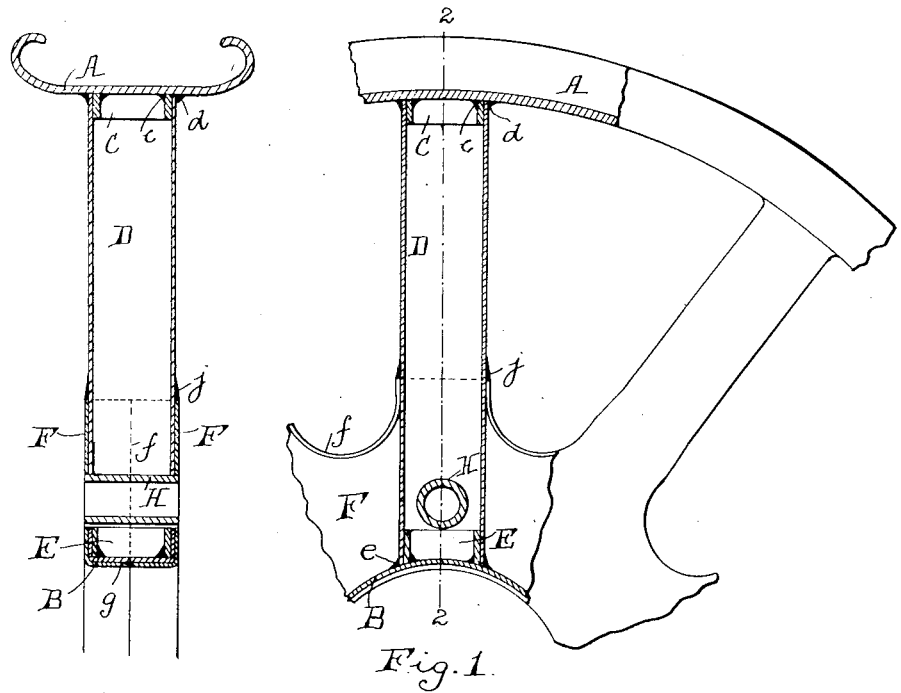
Fig. 2.    Fig. 1.
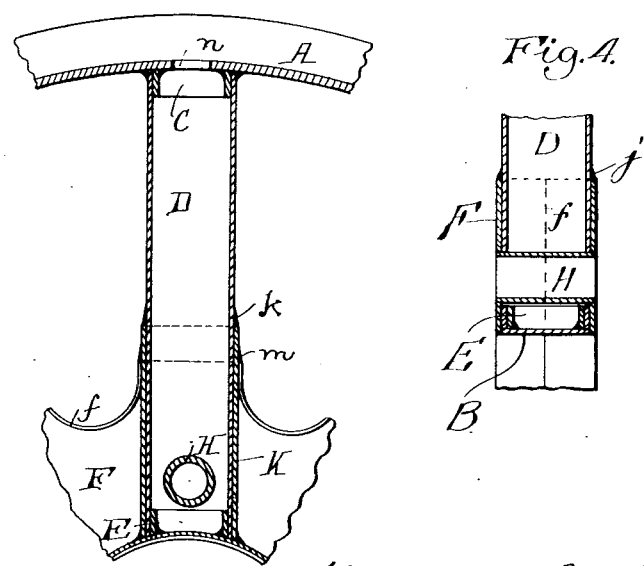
Fig. 3.
Fig. 4.
Harold B Sankey
By H Clarkson Patented Jan. 18, 1927.

1,614,901

UNITED STATES PATENT OFFICE.

HAROLD BANTOCK SANKEY, OF ALBRIGHTON, ENGLAND.

SPOKED WHEEL.

Application filed September 9, 1925, Serial No. 55,308, and in Great Britain September 16, 1924.

This invention relates to wheels of sheet metal with tubular or sheet metal spokes, and has for its object to provide a construction of such wheels which is strong, light and cheap in manufacture.

According to one feature of the invention, the rim is provided with short inwardly projecting tubes or sockets which do not pass through the rim but are welded or otherwise secured to its inner periphery and spaced apart at the necessary intervals required for the number of spokes. These short tubes project into the outer ends of tubular spokes and the latter may be welded or otherwise secured at their outer ends to the inner periphery of the rim.

According to another feature of the invention, the spokes, at their inner ends, butt up against a metal hoop forming the inner periphery of the nave, and pass over short outwardly projecting tubes or sockets welded or otherwise secured to the outer periphery of the metal hoop. The hoop may be cut across at one or more places to facilitate assembly after which the joints may be welded. The inner ends of the spokes also may be welded or otherwise secured to the hoop.

After assembling the spokes upon the hoop, two annular side plates may be secured over the inner ends of the spokes one at either side of the wheel, and such plates are shaped at their outer edges to fit around the spokes and meet at or near the mid plane of the wheel thus to complete the nave. The junctions of the plates with the hoop and with the spokes, and also the junctions of the plates with each other, are afterwards welded up.

Holes for the bolts may be drilled through the side plates and spokes, and suitable bushes inserted, welded if desired or otherwise secured.

The welding at the various places may be performed by oxy-acetylene, oxy-hydrogen or some form of electric welding.

The spokes may be either parallel or tapered either way from their ends, or may be of other shape in longitudinal section. They may be formed from drawn or butted tubes or may be formed in two longitudinal halves welded or otherwise secured at the joint or joints.

Each spoke may be reinforced or strengthened by a tube fitting tightly over it and secured, if necessary, by spot welding or the like. In this case the junctions of the plates with the spokes mentioned above may be made by welding the plates to the reinforcement tubes.

Convenient applications of the invention are described with reference to the drawings herewith, of which:—

Figure 1 is a fragmentary part sectional view the section being taken in the midplane of the wheel and showing the side plates of the nave before they are welded together.

Figure 2 is a section taken on the line 2, 2, of Figure 1; and,

Figure 3 is a fragmentary mid-plane sectional view to illustrate a modified form of the invention.

Figure 4 is a sectional view similar to the lower part of Figure 1 and showing a slight modification of the side plate arrangement.

Referring first to Figures 1 and 2, A is the wheel rim and B a metal hoop forming the inner periphery of the nave. To the inner surface of the rim A, short sockets C are welded the welding being performed preferably at the inner side edge as shown at $c$, but the welding may be performed on the outer side if desired. The spokes D are placed with their outer ends over the sockets and are welded to the inner periphery of the rim as shown at $d$. To the outer periphery of the hoop B similar sockets E are welded in a similar manner, and the inner ends of the spokes are placed over these sockets and they may be welded if desired at their inner ends to the hoop as shown at $e$, but such is not essential.

Two metal plates F F are then placed one at each side of the inner ends of the spokes and such plates have pressed therein semicircular radial grooves as seen from the inner surface to fit upon the outer surfaces of the spokes. The plates meet each other edgewise between the spokes as indicated at $f$ and such meeting edges are welded together. The plates F are either welded at their inner peripheral edges directly to the outer edges of the hoop B or they are bent in across the inner periphery of the hoop and meet as indicated at $g$ in Figure 2, where they are welded together. The plates are also welded at their channel ends to the spokes as indicated at $j$.

H are metal ferrules for the securing bolts and pass through transverse holes in the spokes or some of them and through corresponding holes in the side plates F.

A considerable advantage in the construction lies in the carrying of the spokes right down to the hoop which forms the inner wall of the nave, as they serve to stiffen the nave and to reinforce the bolt holes.

If the spokes are of comparatively large diameter at their inner ends, compared with their spacing apart, it may be found necessary to form them tapered as seen from the side.

Referring to Figure 3 the construction is very similar except that the spokes at their inner ends are reinforced by external tubes K which are welded at their outer ends to the tubes D as indicated at $k$ in Figure 3. In this case the side plates F are welded to the tubes K as indicated at $m$.

At the points where the sockets O or E are secured to the rim or hoop, as the case may be, holes such as $n$ (Figure 3) may be formed in the rim or hoop, but in the case of the rim such holes would need to be closed by a cap or in any other well known manner. Holes thus formed in the rim serve to facilitate the internal welding, and such holes in the hoop serve to lighten it without appreciably weakening the construction. They are in such case covered in by the turned in portions of the side plates.

In the form shown in Figure 4 these side plates F will, as there disclosed, be seen to terminate at the edges of the metal hook B.

Having fully described my invention what I claim and desire to secure by Letters Patent is:—

1. A wheel center including a plain metal hoop forming the inner periphery of the nave, a series of sockets welded to the plain exterior surface of the hoop in circumferentially spaced relation, spokes each engaging over a respective socket, and a pair of metal plates having each a centrally disposed opening and fitting said hoop, said plates being provided with opposed grooves fitting opposite sides of said spokes.

2. A wheel center including a plain metal hoop forming the inner periphery of the nave, a series of sockets welded to the plain exterior surface of the hoop in circumferentially spaced relation, spokes each engaging over a respective socket, and a pair of metal plates having each a centrally disposed opening and fitting said hoop, said plates being provided with opposed grooves fitting opposite sides of said spokes, and said plates being in contact at their outer peripheries and being there welded together.

3. A wheel center including a plain metal hoop forming the inner periphery of the nave, a series of sockets welded to the plain exterior surface of the hoop in circumferentially spaced relation, spokes each engaging over a respective socket, and a pair of metal plates having each a centrally disposed opening and fitting said hoop, said plates being provided with opposed grooves fitting opposite sides of said spokes, and said plates being in contact at their outer peripheries and being there welded together, and welded also at the outer edges of the grooves to the spokes.

In witness whereof I have hereunto signed my name this 24th day of August, 1925.

HAROLD B. SANKEY.